S. CLARK.
CAR AXLE BEARING.
No. 182,641. Patented Sept. 26, 1876.
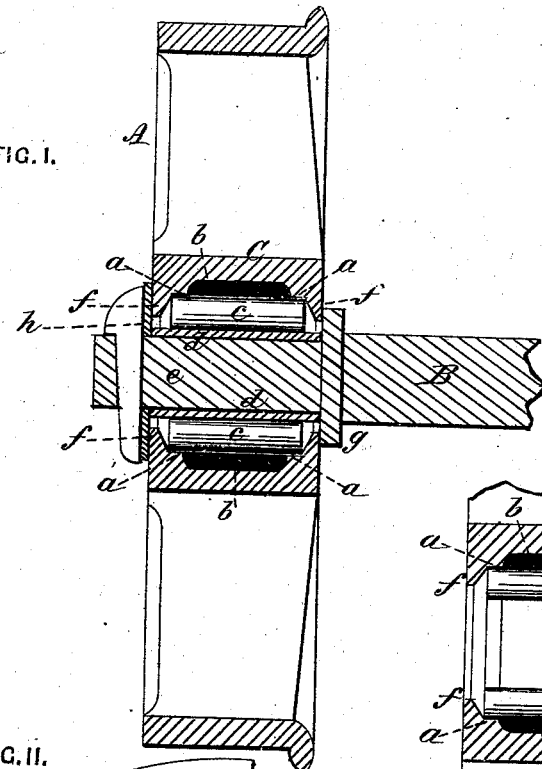
FIG. I.
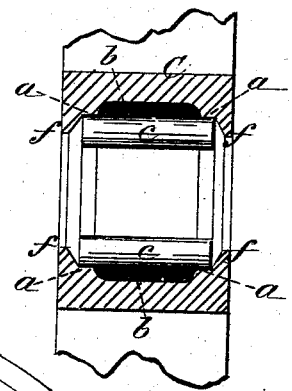
FIG. III.
FIG. II.
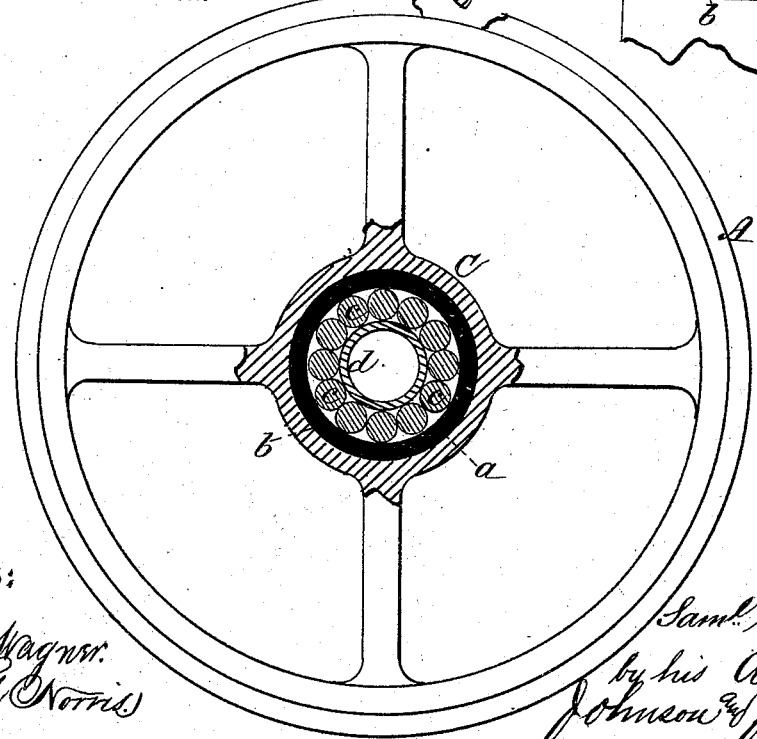
Witnesses:
J. West Wagner
Floyd Norris
Saml. Clark
by his Attorneys
Johnson & Johnson

UNITED STATES PATENT OFFICE.

SAMUEL CLARK, OF HOLLIDAYSBURG, PENNSYLVANIA.

IMPROVEMENT IN CAR-AXLE BEARINGS.

Specification forming part of Letters Patent No. 182,641, dated September 26, 1876; application filed August 14, 1876.

*To all whom it may concern:*

Be it known that I, SAMUEL CLARK, of Hollidaysburg, in the county of Blair and State of Pennsylvania, have invented certain new and useful Improvements in Axle-Bearing Rollers for Pit-Car Wheels, of which the following is a specification:

In mining-pits it is necessary that the car-wheels should run with as little friction as possible, and the axle-bearings should be kept well oiled, and be of simple construction.

In my plan for effecting this, I make the hub of the wheel hollow, with bearings at each end, formed by annular seats, for loose rolls to rest upon and form the axle-bearing. Within and between these annular seats an oil-chamber is formed, which, in connection with a chamber formed by the ends of the hub, will hold oil sufficient to nearly cover the rolls upon which the axle rests.

In connection with the loose bearing-rolls I combine a loose sleeve upon the axle-bearing, so that the sleeve and rolls turn independently of each other, and the wheel turns independently of both, and thus greatly reduces the friction of these parts.

I have found that to obtain the best results from anti-friction rolls in journal-bearings that they should be free from end connections and have no journal-bearings themselves, as by such construction it is not only difficult to fit them in true, but the small bearings at their ends are liable to become locked, and they do not work true; whereas the loose rolls, bearing one upon the other, and upon the hub-end seats in the hub, and upon the sleeve of the axle, avoid these objections and produce a very easy bearing for the wheel.

The oil-chamber is formed by and between the open ends of the hub, and these open ends, being cast with the hub, require no fastenings, which are liable to become loose, while the open hub ends serve to confine the loose rolls in place, so that they form a revolving box, completely covering the wall-seats of the hub, and bearing upon the loose axle-sleeve, which itself is confined between a shoulder on the axle at the inner side of the wheel, and a washer-plate upon the end of the axle, so that it may be easily removed and replaced when worn, and in which the shoulder and the washer-plate serve to completely close the annular open hub ends.

In the accompanying drawings, Figure 1 represents a vertical section of a car-wheel and axle-bearing embracing my invention; and Fig. 2, a vertical cross-section of the wheel-hub.

The wheels A of the car are adapted to turn upon the axle B. The hub C of the wheel has a large opening, with annular seats $a$ at each end, which serve to form between them an oil-chamber, $b$, outside of the rolls and bearings for the ring of rolls $c$, which are fitted close together loosely, and form a revolving box upon said seats $a$, without end connections or journals, as they are sustained one upon the other, and upon a loose sleeve, $d$, fitted upon the axle-bearing $e$, and are held in place endwise by open annular ends $f$, Fig. 3, cast with the hub, and immediately outside of the axle-hub seats $a$, so that no fastenings are required for the ring of anti-friction rolls.

The axle-sleeve $d$ is held in place by and between a shoulder, $g$, on the axle, and a washer-plate, $h$, on the end of said axle, fastened by screw-nut or key in any suitable manner. This shoulder and washer-plate also serve to close that portion of the annular hub-end openings outside of the axle, and thereby close up the hub-chamber, within which the rolls are arranged to confine the oil, which, being supplied, lubricates the loose rolls, the loose sleeve, and the axle-bearing.

The loose ring of rolls, joining each other, can revolve with and independent of the revolutions of the wheel, and each separate roll revolves independently of the other within the ring, and with these the sleeve revolves upon the axle, and co-operates with the loose ring of rolls to produce the best effect in reducing friction, both upon the hub and the axle.

The loose rolls are put in place between the open hub ends through the outer annular openings, and held in position, and the wheel is placed upon the axle and secured by the washer-plate in any suitable way.

The loose sleeve can be removed and replaced when worn by simply removing the washer-plate; and the sleeve for this purpose projects beyond the ends of the ring of rolls and against the inner side of the washer-plate, so that it can be easily taken hold of and drawn out the open hub end.

There are no bolts and no joinings to get loose, and the hub of the wheel is made large enough to contain the friction-reducing parts, with a sufficient supply of the lubricant to last for some time.

The device can be applied to all kinds of wheels and axles as well as pulleys.

I claim—

1. The combination, with the annular hub-end seats $a$ and the ring of loose rolls $c$, of the chamber $b$ for the oil, formed between said seats and outside of the rolls, as and for the purpose described.

2. The combination, with the ring of loose rolls $c$, the hub ends $f$, and the loose sleeve $d$, of the shoulder $g$ and the washer-plate $h$, as and for the purpose described.

3. The hub C, having the integral ends $f$, the end seats $a$ $a$, and the oil-chamber $b$, substantially as described, in combination with the ring of loose rolls $c$, the loose sleeve $d$, the washer-plate $h$, and the shoulder $g$ of the axle, as and for the purpose described.

In testimony whereof I have affixed my signature in the presence of two witnesses.

SAMUEL CLARK.

Witnesses:
 THOS. MCFARLANE,
 C. A. MCFARLAND.